(12) United States Patent
Zunke et al.

(10) Patent No.: US 7,773,753 B2
(45) Date of Patent: Aug. 10, 2010

(54) EFFICIENT REMOTELY-KEYED SYMMETRIC CRYPTOGRAPHY FOR DIGITAL RIGHTS MANAGEMENT

(75) Inventors: Michael Zunke, Kirchheim (DE); Yanki Margalit, Ramat-Gan (IL); Dani Margalit, Ramat-Gan (IL)

(73) Assignee: Aladdin Knowledge Systems Ltd., Petach Tikva (IL)

( * ) Notice: Subject to any disclaimer, the term of this patent is extended or adjusted under 35 U.S.C. 154(b) by 639 days.

(21) Appl. No.: 11/769,724

(22) Filed: Jun. 28, 2007

(65) Prior Publication Data

US 2009/0006865 A1    Jan. 1, 2009

(51) Int. Cl.
*H04K 1/04* (2006.01)
*H04L 9/00* (2006.01)

(52) U.S. Cl. .................. 380/259; 380/260; 380/37; 380/45

(58) Field of Classification Search .......... 380/259, 380/260, 37, 45
See application file for complete search history.

(56) References Cited

U.S. PATENT DOCUMENTS

| | | | |
|---|---|---|---|
| 5,696,823 A | 12/1997 | Blaze | |
| 2006/0050870 A1* | 3/2006 | Kimmel et al. | 380/30 |
| 2006/0218400 A1* | 9/2006 | Kimmel et al. | 713/168 |
| 2007/0081668 A1* | 4/2007 | McGrew et al. | 380/37 |
| 2007/0116282 A1* | 5/2007 | Hawkes et al. | 380/239 |

* cited by examiner

*Primary Examiner*—Nasser Moazzami
*Assistant Examiner*—Mohammad W Reza
(74) *Attorney, Agent, or Firm*—Drinker Biddle & Reath LLP

(57) ABSTRACT

An efficient symmetrical-cryptographic method for using a fast but insecure host to perform encryption/decryption based on a secret key in a secure, but slow hardware token, such as a smartcard or similar device, without revealing the secret key to the host, and such that the ciphertext and plaintext are exactly the same size. The present method is suitable for use in Digital Rights Management and Software Rights Management applications which require precise interchangeability of ciphertext and plaintext in pre-allocated areas of data storage.

8 Claims, 4 Drawing Sheets

EFFICIENT REMOTELY-KEYED SYMMETRIC CRYPTOGRAPHY FOR DIGITAL RIGHTS MANAGEMENT

FIELD OF THE INVENTION

The present invention relates to a method of protecting digital data and, more particularly, to a method for cryptographically supporting digital rights management on a host system via a secret key on a secure remote device.

BACKGROUND OF THE INVENTION

It is often desirable to encrypt and decrypt data stored on a host computer (herein denoted as a "host") via symmetric cryptography utilizing a secret key stored on a remote device, herein denoted as a "token", without revealing the secret key to the host. Preferably, the token is a secure hardware device, ideally having the property that information stored thereon is physically protected from attack. A non-limiting example of a token is a smartcard. Thus, when the token is disconnected and removed from the host, the encrypted data on the host cannot be decrypted until the token is reconnected to the host. Because symmetric cryptography is employed, as noted above, the key used for decryption is the same as the key used for encryption.

Performing encryption and decryption in the above-described manner is referred to as "remotely-keyed encryption", and is disclosed in U.S. Pat. No. 5,696,823 to Blaze, hereinafter denoted as "Blaze".

The primary goal of Blaze is maintaining a high bandwidth for encryption/decryption while protecting the secret key in the token. For Blaze, a token provides adequate security but has insufficient bandwidth (i.e., limited processing and computational power). A host provides sufficient bandwidth (i.e., high processing and computational power), but lacks the security of the token. Blaze teaches a method by which the secret key in the token can be used by the host without revealing the key itself to the host, and in a manner that requires only limited overhead support from the token.

Prior Art Encryption

FIG. 1 conceptually illustrates the prior-art remotely-keyed encryption method of Blaze. A host 101 and a token 103 communicate via a channel 100, which can be a smartcard interface for a smartcard token 103. Plaintext data 107 of size m resides on host 101, and a secret key K 105 resides on token 103. The method of Blaze allows host 101 to encrypt plaintext data 107 without directly requiring secret key 105, and requiring only minimal communication with token 103 and processing thereby.

First, host 101 breaks plaintext data 107 into n plaintext blocks 109, $P_1, P_2, \ldots P_n$, each of size h, in preparation for encryption by a block cipher. It is noted that structurally, Blaze requires that plaintext data 107 be broken into such blocks, and that a block cipher be utilized. A consequence of this is that, in general, the total size of plaintext blocks 109 is greater than that of original plaintext data 107. Unless m happens to be an integer multiple of block size b (which in general will not be the case), nb>m. As a further consequence, the size of resulting ciphertext data 131 will also be larger than that of original plaintext data 107. This is an important restriction on the prior art for certain applications, and is discussed further, below.

Host 101 then combines plaintext blocks $P_2$ through $P_n$ with a hash of plaintext block $P_1$ via an exclusive-OR (XOR) operation, wherein the hash is computed by host 101 using a secure hash function 111. This operation results in intermediate blocks 113 denoted as $I_2$ through $I_n$. The concatenation of intermediate blocks 113 is input by host 101 to hash function 111 for an XOR operation with plaintext block $P_1$ to produce an intermediate block $I_1$ 115. In a transmission 117, host 101 sends block $I_1$ 115 to token 103. Transmission 117 is the only transmission from host 101 to token 103 in the Blaze encryption method.

When token 103 receives intermediate block $I_1$ 115, secret key 105 is used to encrypt intermediate block $I_1$ 115 via an encryption function $E_K$ 119, the result of which is a ciphertext block $C_1$ 121. Immediately thereafter, token 103 uses secret key 105 to encrypt ciphertext block $C_1$ 121 via encryption function $E_K$ 119, the result of which is a derivative key $K_P$ 123. Then, in a transmission 125, token 103 sends both ciphertext block $C_1$ 121 and derivative key $K_P$ 123 to host 101. Transmission 125 is the only transmission from token 103 to host 101 in the Blaze encryption method. It is emphasized, however, that in transmission 125, two data items are sent from token 103 to host 101.

Following transmission 125 from token 103 to host 101, the remaining steps of the encryption according to Blaze are carried out entirely by host 101.

Host 101 uses derivative key $K_P$ 123 to encrypt each of intermediate blocks $I_2$ through $I_n$ 113 via a block encryption function $E_{K_P}$ 127, the results of which are ciphertext blocks $C_2$ through $C_n$ 129. When prefixed with ciphertext block $C_1$ 121, the concatenation produces ciphertext data 131.

Reviewing the above prior-art encryption method, it is pointed out that communication between host 101 and token 103 is minimal, involving only transmission 117 and transmission 125, in which only three data objects ($I_1$, $C_1$, and $K_P$) are transmitted. Furthermore, the processing overhead on token 103 is also minimal, involving only two encryption operations using secret key K 105. The bulk of the processing is performed by host 101, and moreover, secret key K 105 remains on token 103 and is never revealed to host 101. Thus, host 101 is incapable of performing the encryption without token 103. Specifically, without a connection to token 103, host 101 is incapable of performing a second encryption of a second plaintext data even after having performed the above encryption on the first plaintext data. The foregoing are the objectives of the prior-art Blaze encryption method.

Prior Art Decryption

FIG. 2 conceptually illustrates the prior-art remotely-keyed decryption method of Blaze, whose steps are the reverse of the encryption method illustrated in FIG. 1. Starting with a block of ciphertext data 201, whose size is nb, host 101 breaks ciphertext data 201 into n blocks: a block $C_1$ 203 and blocks $C_2$ through $C_n$ 205. In a transmission 207, host 101 transmits ciphertext block $C_1$ 203 to token 103. Transmission 207 is the only transmission from host 101 to token 103 in the Blaze decryption method.

Token 103 uses secret key K 105 as input to a decryption function 219 to derive an intermediate block $I_1$ 209 from ciphertext block $C_1$ 203, which is the complementary operation of that illustrated in FIG. 1 (using secret key K 105 as input to encryption function $E_K$ 119 on block $I_1$ 115 to obtain ciphertext block $C_1$ 121). In addition, token 103 uses secret key K 105 as input to encryption function $E_K$ 119 to obtain a derivative key $K_P$ 223 from ciphertext block $C_1$ 203, which is a similar operation of that illustrated in FIG. 1 (using secret key K 105 as input to encryption function $E_K$ 119 to obtain derivative key $K_P$ 123 from ciphertext block $C_1$ 121). Then, in a transmission 225, token 103 sends both intermediate block $I_1$ 209 and derivative key $K_P$ 223 to host 101. Transmission 225 is the only transmission from token 103 to host 101 in the Blaze decryption method. It is emphasized, however, that in transmission 225, two data items are sent from token 103 to host 101.

Following transmission 225 from token 103 to host 101, the remaining steps of the decryption according to Blaze are carried out entirely by host 101.

Using a derivative key $K_P$ 223 as input to a decryption function $D_{K_P}$ 227, host 101 obtains intermediate blocks $I_2$ through $I_n$ 213 from ciphertext blocks $C_2$ through $C_n$ 205. This is the complementary operation of that illustrated in FIG. 1 (using derivative key $K_P$ 123 with encryption function $E_{K_P}$ 127 to obtain ciphertext blocks $C_2$ through $C_n$ 121 from intermediate blocks $I_2$ through $I_n$ 113).

Next, host 101 uses intermediate blocks $I_2$ through $I_n$ 213 as input to hash function 111 for the XOR that derives a plaintext block $P_1$ from intermediate block $I_1$ 209. Referring to FIG. 1, it is seen that this is complementary to the similar step of obtaining intermediate block $I_1$ 115 from block $P_1$ of plaintext blocks 109, because the XOR operation is bidirectionally symmetrical.

Then host 101 inputs plaintext block $P_1$ into hash function 111 and performs the XOR operation that completes the transformation of $I_2$ through $I_n$ 213 into plaintext blocks $P_2$ through $P_n$ for concatenation with plaintext block $P_1$ to obtain plaintext blocks $P_1$ through $P_n$ 209, which then yield plaintext data 231 to complete the decryption process.

Likewise reviewing the above prior-art decryption method, it is pointed out that communication between host 101 and token 103 is minimal, involving only transmission 207 and transmission 225, in which only three data objects ($C_1$, $I_1$, and $K_P$) are transmitted. Furthermore, the processing overhead on token 103 is also minimal, involving only one encryption operation and one decryption operation using secret key K 105. The bulk of the processing is performed by host 101, and moreover, secret key K 105 remains on token 103 and is never revealed to host 101. Thus, host 101 is incapable of performing the decryption without token 103. Specifically, without a connection to token 103, host 101 is incapable of performing a second decryption of a second ciphertext data even after having performed the above decryption on the first ciphertext data. The foregoing are the objectives of the prior-art Blaze encryption method.

It is pointed out however, that the size of plaintext data 231 (FIG. 2) is necessarily a multiple of the block size b, whereas the size of plaintext data 107 (FIG. 1) is in general not a multiple of a block size.

Restrictions of the Prior Art

Although Blaze achieves its goals, there are restrictions on the prior art which preclude utilization in an important area of Digital Rights Management, as detailed below. The restriction is associated with the fact that ciphertext data typically has a larger size than the equivalent plaintext, as previously discussed. In practical terms, the expansion of plaintext data 107 (of size m) into plaintext blocks 109 (of size nb>m generally) is typically facilitated by padding plaintext data 107 to a size of nb.

The expansion of the ciphertext, as noted above, is problematical in certain applications, as detailed below. In addition to the expansion of the ciphertext, the use of padding can lead to further problems under certain circumstances, because such padding may have to be removed after decryption from ciphertext data 131, and additional information must therefore be provided to enable the correct removal of the padding.

Special Digital Rights Management Requirement

Digital Rights Management (hereinafter referred to as "DRM") concerns administering and enforcing usage restrictions on proprietary digital material, such as executable computer programs and digital content, including data and multimedia material.

Cryptographic techniques are important tools for DRM, but there is often an additional special requirement on encryption/decryption, because the plaintext of the data to be encrypted may reside in an allocated area of data storage, wherein the ciphertext after encryption is to be interchanged, or substituted for the plaintext. That is, the ciphertext must be able to reside within the same pre-allocated storage area as originally occupied by the plaintext, and vice-versa. In these DRM applications, the size of the ciphertext must therefore not exceed that of the plaintext. In order to obtain the highest security levels for such applications, the ciphertext must be exactly the same size as the plaintext. This is a special requirement, which is not supported by the prior art.

In a non-limiting example of this special requirement, a DRM application involves protecting portions of the executable code of a piece of computer software. DRM for such an application is often denoted as "Software Rights Management" or "SRM". In typical cases, one or more modules of the computer software are encrypted, and thus cannot be executed until the ciphertext thereof is replaced by the decrypted plaintext. For this to function properly without affecting the operation of other modules in the software, the above-described special requirement is necessary: the ciphertext after encryption must be exactly the same size as the plaintext.

It can thus be seen that the prior-art method of Blaze is generally inadequate for this special requirement because Blaze necessitates breaking the plaintext into equal-sized blocks (wherein each block has a plurality of bits), deriving intermediate results therefrom, and finally using a block cipher to encrypt each block separately. Unless the size of the plaintext happens to be an exact multiple of the block size (which in general is not the case), Blaze requires that the plaintext be extended (e.g., through padding) to the nearest multiple of the block size before encryption. The ciphertext of Blaze is therefore in general larger than the original (non-padded) plaintext, and does not meet the additional requirement described above.

There is thus a need for, and it would be highly advantageous to have, a method for efficient remotely-keyed cryptography, wherein the size of the ciphertext does not exceed the size of the plaintext. This goal is met by the present invention.

SUMMARY OF THE INVENTION

The present invention is of a method for remotely-keyed encryption wherein the size of the plaintext data is not constrained to being a multiple of a block size. Accordingly, the basic encryption algorithm of the present invention is not restricted to being a block cipher, but can be any secure encryption scheme, such as a stream cipher. A stream cipher, in particular, can be used to encrypt plaintext of any size into ciphertext of the exact same size. Thus, ciphertext output by embodiments of the present invention can be substituted for the plaintext in the same storage area previously allocated for the plaintext, in keeping with the special DRM requirement discussed above.

Therefore, according to the present invention there is provided a method for encryption of plaintext data on a host, the plaintext data having an arbitrary data size, the encryption based on a secret key stored in a token connected to the host without revealing the secret key to the host, the method including: (a) in the host, dividing the plaintext data into a small plaintext section and a large plaintext section, wherein the small plaintext section has a predetermined size, and wherein the large plaintext section has a size different from the predetermined size; (b) in the host, computing a value based on the small plaintext section; (c) sending the value from the host to the token; (d) in the token, encrypting the value according to the secret key to obtain a derivative key; (e) in the token, encrypting the derivative key according to the secret key, to obtain a small ciphertext section; (f) sending the derivative key and the small ciphertext section to the host; (g) in the host, encrypting the large plaintext section according to the derivative key, to obtain a large ciphertext section, wherein the large ciphertext section has a size identical to that of the large plaintext section; and (h) in the host, combining the small ciphertext section and the large ciphertext section to obtain ciphertext data having the arbitrary data size, and wherein the ciphertext data is the encryption of the plaintext data.

In addition, according to the present invention there is provided a method for decryption of ciphertext data on a host, the ciphertext data having an arbitrary data size, the decryption based on a secret key stored in a token connected to the host without revealing the secret key to the host, the method including: (a) in the host, dividing the ciphertext data into a small ciphertext section and a large ciphertext section, wherein the small ciphertext section has a predetermined size, and wherein the large ciphertext section has a size different from the predetermined size; (b) sending, from the host to the token, the small ciphertext section; (c) in the token, decrypting the small ciphertext section according to the secret key to obtain a derivative key; (d) in the token, decrypting the derivative key according to the secret key, to obtain a value; (e) sending the derivative key and the value to the host; (f) in the host, decrypting the large ciphertext section according to the derivative key, to obtain a large plaintext section, wherein the large plaintext section has a size identical to that of the large ciphertext section; (g) in the host computing a small plaintext section based on the value; (h) in the host, combining the small plaintext section and the large plaintext section to obtain plaintext data having the arbitrary data size, and wherein the plaintext data is the decryption of the ciphertext data.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of methods according to the present invention may be understood with reference to the drawings and the accompanying description.

Figure 3:
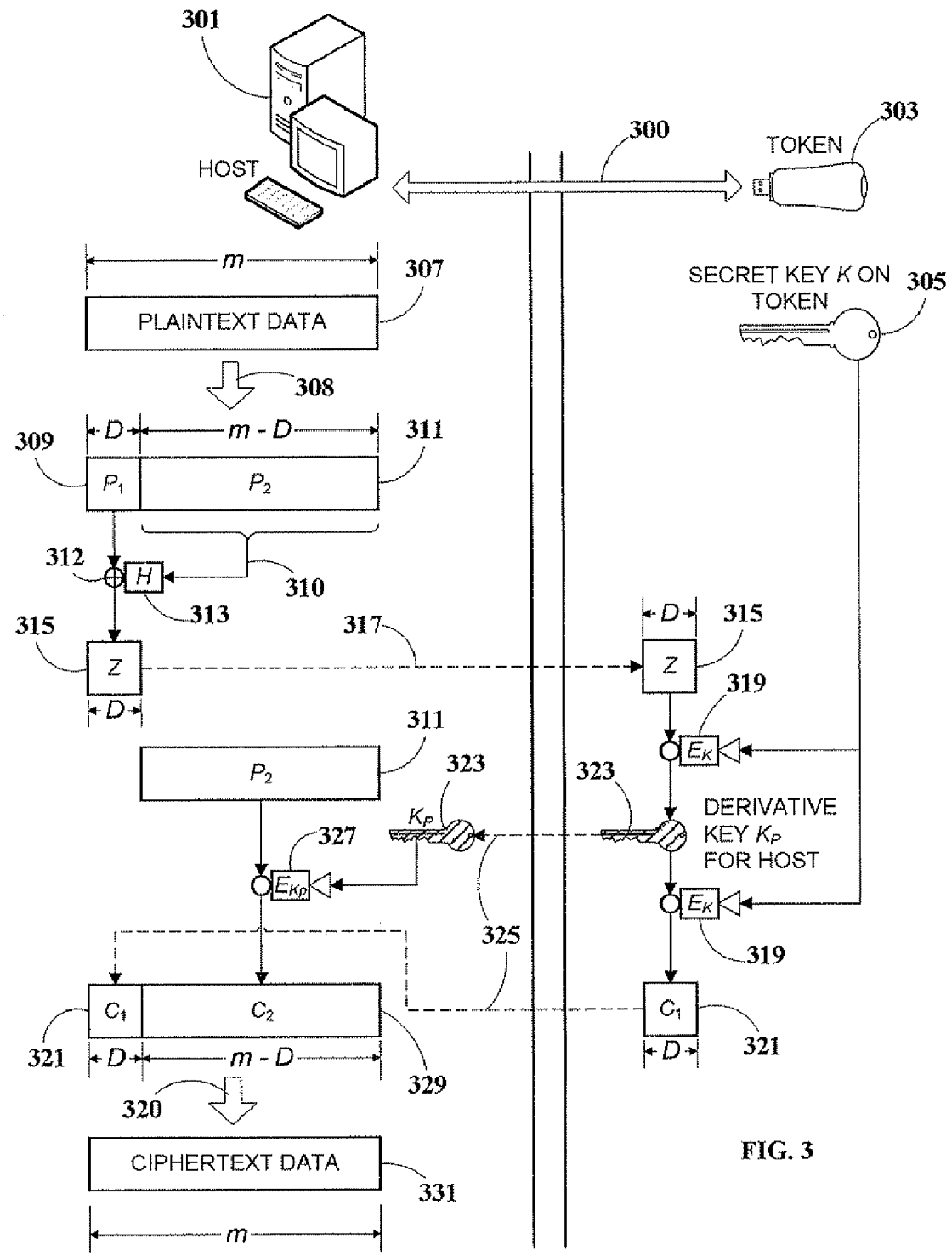
FIG. 3 conceptually illustrates remotely-keyed encryption suitable for DRM, according to an embodiment of the present invention.

FIG. 3 conceptually illustrates an embodiment of the present invention for encrypting data in a manner suitable for use in DRM, as described above. In particular, the method illustrated for encryption features a novel aspect over the prior art, in that plaintext data is encrypted into ciphertext data having the exact same size as the plaintext data.

A host 301 is connected via a channel to a secure token 303, which holds a secret key K 305. In a step 308, host 301 divides plaintext data 307 having a size m into two sections: a section $P_1$ 309 having a predetermined size D; and a section $P_2$ 311 having a size m−D. In general, therefore, section $P_1$ 309 and section $P_2$ 311 have different sizes. Typically, section $P_1$ 309 is smaller in size than section $P_2$ 311, and therefore section $P_1$ 309 is denoted as the "small section" and section $P_2$ 311 is denoted as the "large section", where the terms "small" and "large" herein denote the typical respective relative sizes. In actual practice, the absolute value of m is determined by the (arbitrary) size of the plaintext data that is to be encrypted; the absolute value of D is predetermined according to the output size of a secure, collision-resistant hash function H 313. The terms "small" and "large" herein denote sections of text (both plaintext and ciphertext) that have been divided into sizes of D and m−D, respectively (non-limiting examples of which are section $P_1$ 309 and $P_2$ 311, respectively), regardless of the actual value of D relative to that of m−D. In general, m−D is not an integer multiple of D, and L is different from m−D (i.e., in general m≠2D). Thus the "Special Digital Rights Management Requirement" previously discussed is significant, because prior art remotely-keyed encryption cannot accommodate this special requirement under the general condition that m≠nD for integer values of n.

Hash function H 313 can accept an input of arbitrary size. Typically, the input of hash function H 313 has a size that is greater than the output, in keeping with the typically greater size of section $P_2$ 311 relative to that of section $P_1$ 309. It is further noted that the dividing in step 308 may be a logical dividing or a physical dividing.

Figure 1:
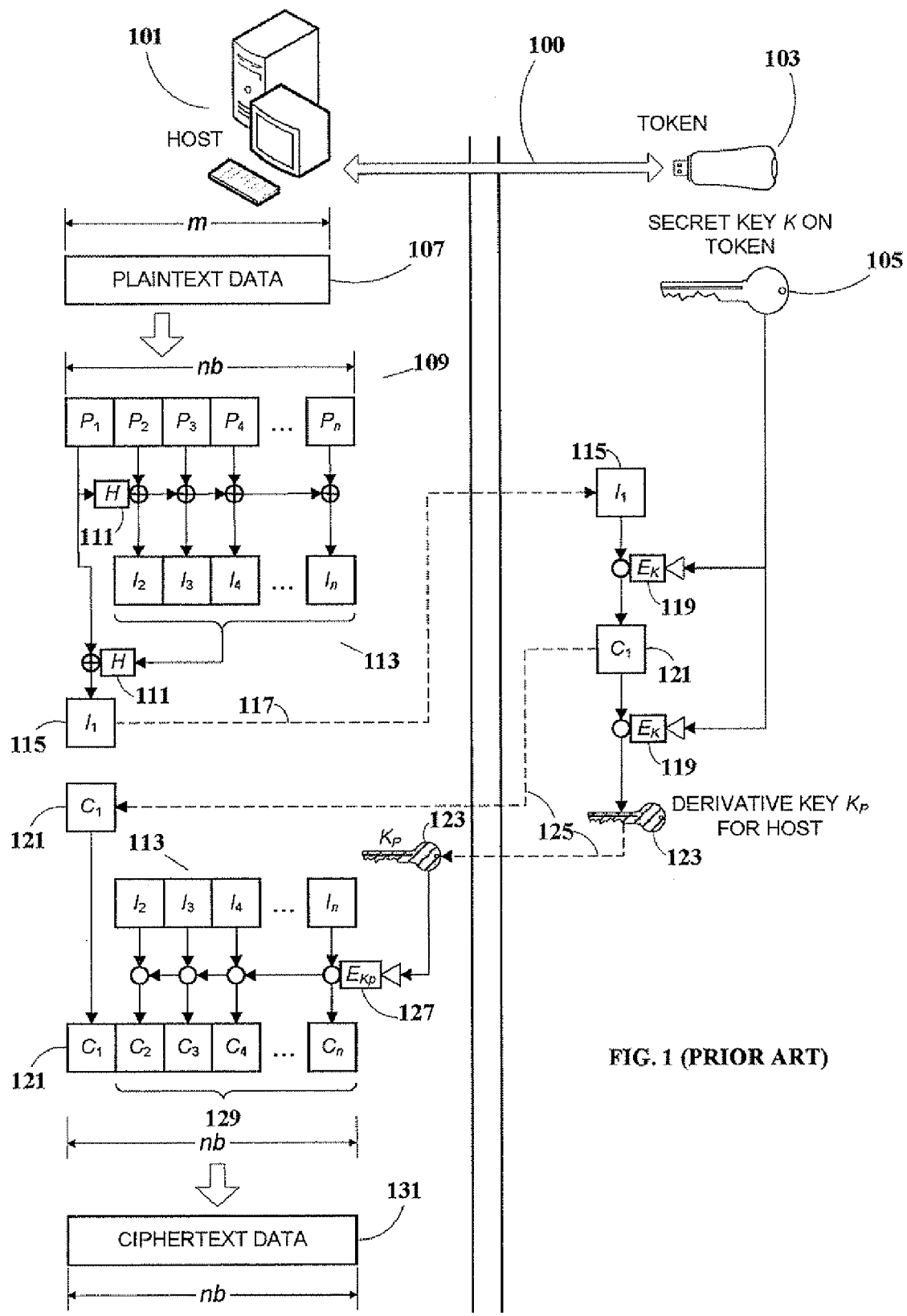
FIG. 1 conceptually illustrates prior-art remotely-keyed encryption.

The foregoing portion of the present method embodiment is to be immediately contrasted with the initial steps of the prior art method as illustrated in FIG. 1 and described previously. It is noted that the prior art breaks plaintext data 107 into n equal-sized blocks 109, whereas the present method embodiment breaks plaintext data 307 into exactly two sections of typically unequal size: a small section 309; and a large section 311.

In a step 310, section $P_2$ 311 is input to hash function H 313, whose output is used in an XOR step 312 that computes an intermediate value Z 315 from section $P_1$ 309. Intermediate value Z 315 is thus based on section $P_1$ 309, and is also a function of a hash of section $P_2$ 311. In general, then, intermediate value Z 315 can also be considered a cryptographic function of plaintext data 307. As can be seen from FIG. 3, intermediate value Z has the same size, D, as $P_1$.

The foregoing portion of the present method embodiment is also to be contrasted with the prior art method as illustrated in FIG. 1 and described previously. It is noted that the prior art computes a hash of plaintext block $P_1$ and applies an XOR operation on each of plaintext blocks $P_2$ through $P_n$ 109 to obtain intermediate results $I_2$ through $I_n$ 113, whereas the present method embodiment does not include any operation corresponding to this step, and does not compute or use an intermediate result for plaintext section $P_2$ 311.

In a transmission step 317, intermediate value Z 315 is sent to token 303. Transmission 317 is the only transmission from host 301 to token 303 in the encryption method embodiment according to the present invention.

Next, token 303 encrypts intermediate value Z 315 using secret key K 305 input into an encryption function 319 to obtain a derivative key $K_P$ 323. Token 303 then encrypts derivative key $K_P$ 323 using secret key K 305 input into encryption function 319 to obtain a ciphertext section $C_1$ 321.

In a transmission step 325, token 303 sends derivative key $K_P$ 323 and ciphertext section $C_1$ 321 to host 301. Transmission 325 is the only transmission from token 303 to host 301 in the encryption method embodiment according to the present invention. It is emphasized, however, that in transmission 325, two data items are sent from token 303 to host 301.

Next, host 301 encrypts plaintext section $P_2$ using derivative key $K_P$ 323 input into an encryption function 327 to obtain a ciphertext section $C_2$ 329. Host 301 then combines, in a step 320, ciphertext section $C_1$ 321 as received from token 303 in transmission step 325 with ciphertext section $C_2$ 329, to obtain ciphertext data 331. Ciphertext data 331 is the encryption of plaintext data 307, and, it is noted, ciphertext data 331 has exactly the same size, m, as plaintext data 307. The combining in step 320 can be a logical or physical combining of data. Typically, the combining is a logical concatenation of the data.

It is noted that, according to the present invention, small ciphertext section $C_1$ 321 is not encrypted by host 301 at any point.

Reviewing the above encryption method embodiment according to the present invention, it is pointed out that communication between host 301 and token 303 is minimal, involving only transmission 317 and transmission 325, in which only three data objects (Z, $C_1$, and $K_P$) are transmitted. Furthermore, the processing overhead on token 303 is also minimal, involving only two encryption operations using secret key K 305. The bulk of the processing is performed by host 301, and moreover, secret key K 305 remains on token 303 and is never revealed to host 301. Thus, host 301 is incapable of performing the encryption without token 303. Specifically, without a connection to token 303, host 301 is incapable of performing a second encryption of a second plaintext data even after having performed the above encryption on the first plaintext data. Moreover, as has been noted above, the resulting ciphertext is always the exact same size as the plaintext. The foregoing include both the objectives of the prior-art as well as the additional requirement for use in DRM applications. Furthermore, the encryption method embodiment of the present invention is more efficient than that of the prior art, because intermediate results (corresponding to $I_2$ through $I_n$ 113 in FIG. 1) are not required, thereby reducing the processing load on host 301.

Decryption

Figure 4:
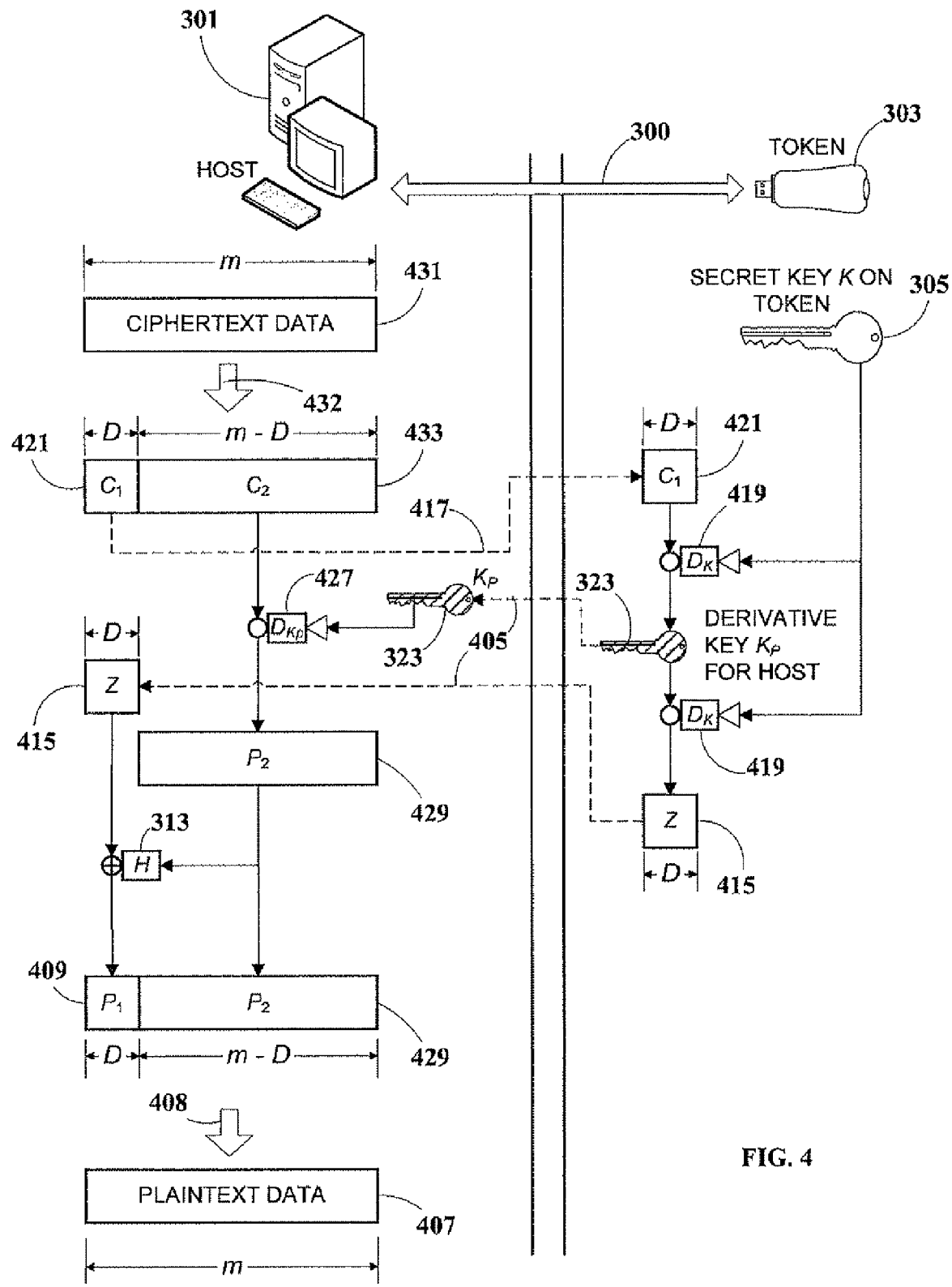
FIG. 4 conceptually illustrates remotely-keyed decryption suitable for DRM, according to an embodiment of the present invention.

FIG. 4 conceptually illustrates an embodiment of the present invention for decrypting data in a manner suitable for use in DRM, as described above. As with the encryption method embodiment shown in FIG. 3, the method illustrated for decryption features the novel aspect over the prior art, in that ciphertext data is decrypted into plaintext data having the exact same size as the ciphertext data.

Starting with a block of ciphertext data 431, whose size is m, in a step 432 host 301 divides ciphertext data 431 into exactly two sections: a small section $C_1$ 421 having the predetermined size D and a large section $C_2$ 433 having a size m−D. As detailed previously, the terms "small" and "large" herein denote sections of text having sizes of D and m−D, respectively; the value of D is predetermined according to the output size of hash function H 313, and m is determined by the (arbitrary) size of the ciphertext data that is to be decrypted. The previous remarks regarding D and m−D apply here as well. Also as before, the dividing in step 432 may be a logical dividing or a physical dividing.

Figure 2:
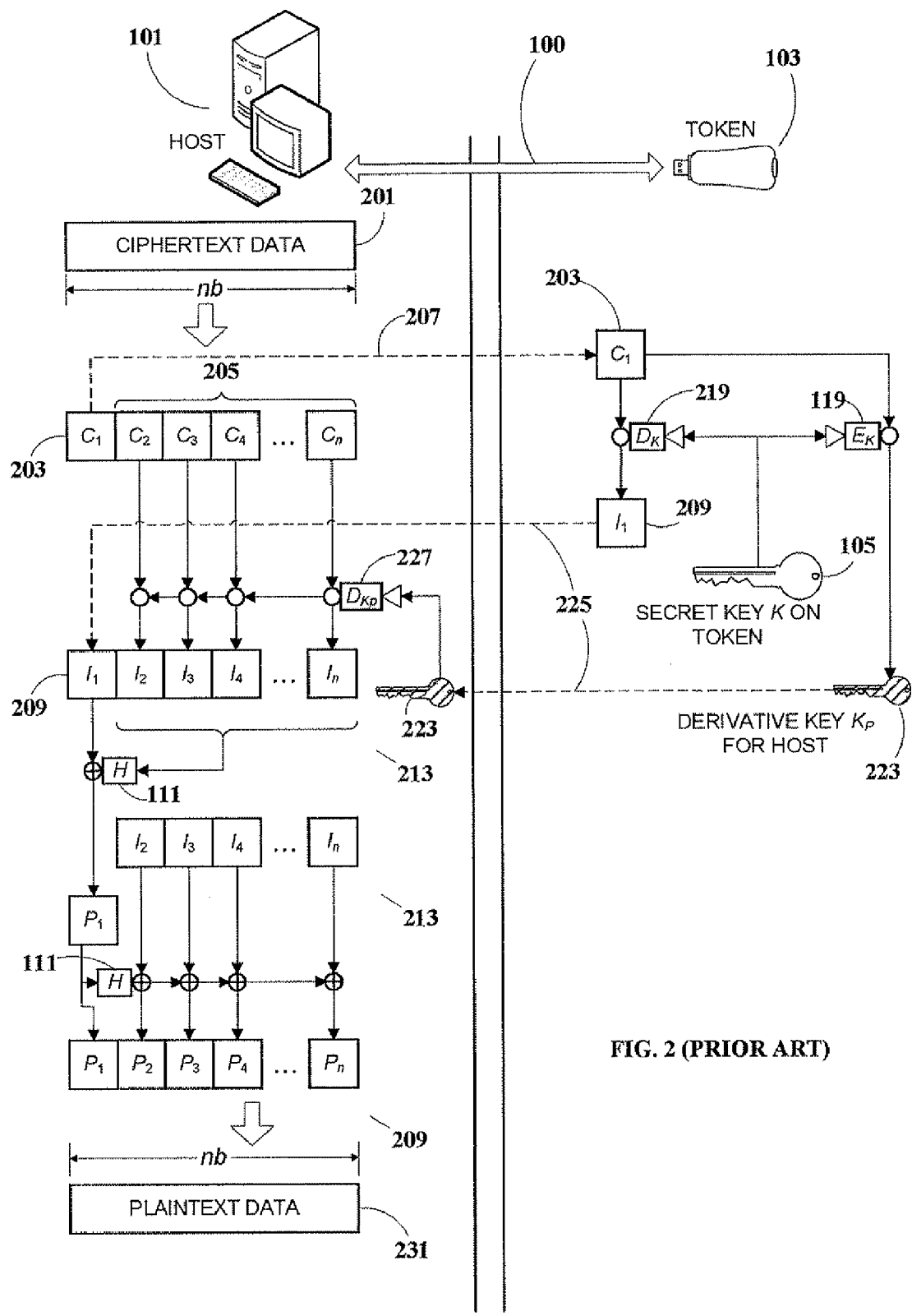
FIG. 2 conceptually illustrates prior-art remotely-keyed decryption.

The foregoing portion of the present method embodiment is to be immediately contrasted with the initial steps of the prior art method as illustrated in FIG. 2 and described previously. It is noted that the prior art breaks ciphertext data 201 into n equal-sized blocks 205 and 203, whereas the present method embodiment breaks ciphertext data 431 into exactly two sections of (generally) unequal size: a (generally) smaller section 421; and a (generally) larger section 433.

In a transmission 417, host 301 transmits ciphertext section $C_1$ 421 to token 303. Transmission 417 is the only transmission from host 301 to token 303 in the decryption method embodiment according to the present invention.

Next, token 303 decrypts ciphertext section 421 using secret key K 305 input into a decryption function 419 to obtain derivative key $K_P$ 323. Token 303 then decrypts derivative key $K_P$ 323 using secret key K 305 input into decryption function 419 to obtain intermediate value Z 415.

In a transmission step 405, token 303 sends derivative key $K_P$ 323 and intermediate value Z 415 to host 301. Transmission 405 is the only transmission from token 303 to host 301 in the decryption method embodiment according to the present invention. It is emphasized, however, that in transmission 405, two data items are sent from token 303 to host 301.

Next, host 301 decrypts section $C_2$ 433 via a decryption function 427 using derivative key 323 to obtain a plaintext section $P_2$ 429. Host 301 also uses section $P_2$ 429 as an input to hash function 313, the output of which is applied in an XOR operation to compute a plaintext section $P_1$ 409 based on intermediate value Z 415. In general, then, plaintext section $P_1$ 409 can be considered a cryptographic function of intermediate value Z 415 and plaintext section $P_2$ 429.

Once again, the foregoing portion of the present method embodiment is also to be contrasted with the prior art method as illustrated in FIG. 2 and described previously. It is noted that the prior art computes a hash of plaintext block $P_1$ and applies an XOR operation on each of intermediate blocks $I_2$ through $I_n$ 213 to obtain plaintext blocks $P_2$ through $P_n$ 209, whereas the present method embodiment does not include any operation corresponding to this step, and does not require, or use in any computations, intermediate blocks corresponding to $I_2$ through $I_n$ 213.

In a combining step 408, host 301 combines plaintext section $P_1$ 409 with plaintext section $P_2$ 429 to obtain plaintext data 407, to complete the decryption of ciphertext data 431. The combining in step 408 can be a logical or physical combining of data. As before, the combining is typically a logical concatenation of the data. It is also noted that plaintext data 407 has exactly the same size, m, as ciphertext data 431.

Further reviewing the above decryption method embodiment according to the present invention, it is pointed out that communication between host 301 and token 303 is minimal, involving only transmission 417 and transmission 405, in which only three data objects ($C_1$, Z and $K_P$) are transmitted. Furthermore, the processing overhead on token 303 is also minimal, involving only two decryption operations using secret key K 305. The bulk of the processing is performed by host 301, and moreover, secret key K 305 remains on token 303 and is never revealed to host 301. Thus, host 301 is incapable of performing the decryption without token 303. Specifically, without a connection to token 303, host 301 is incapable of performing a second decryption of a second ciphertext data even after having performed the above decryption on the first ciphertext data. Moreover, as has been noted above, the resulting plaintext is always the exact same size as the ciphertext. The foregoing include both the objectives of the prior-art as well as the additional requirement for use in DRM applications. Furthermore, the decryption method embodiment of the present invention is more efficient than that of the prior art, because intermediate results (corresponding to $I_2$ through $I_n$ 213 in FIG. 2) are not required, thereby reducing the processing load on host 301.

While the invention has been described with respect to a limited number of embodiments, it will be appreciated that many variations, modifications and other applications of the invention may be made.

The invention claimed is:

1. A method for encryption of plaintext data on a host, the plaintext data having an arbitrary data size, the encryption based on a secret key stored in a hardware token separate from the host and connected to the host without revealing the secret key to the host, the method comprising:

in the host, dividing the plaintext data into a first plaintext section and a second plaintext section, wherein said first plaintext section has a predetermined size, and wherein said second plaintext section has a size larger than said predetermined size of the first plaintext section;

in the host, computing a value based on said first plaintext section;

sending said value from the host to the hardware token;

in the hardware token, encrypting said value according to the secret key to obtain a derivative key;

in the hardware token, encrypting said derivative key according to the secret key, to obtain a first ciphertext section;

sending said derivative key and said first ciphertext section to the host;

in the host, encrypting said second plaintext section according to said derivative key, to obtain a second ciphertext section, wherein said second ciphertext section has a size identical to that of said second plaintext section; and in the host, combining said first ciphertext section and said second ciphertext section to obtain ciphertext data having a size identical to the arbitrary data size of said plaintext data, and wherein said ciphertext data is the encryption of the plaintext data.

2. The method of claim 1, wherein the size of said second plaintext section is not an integer multiple of said predetermined size.

3. The method of claim 1, wherein said encrypting said second plaintext section is done by a stream cipher.

4. The method of claim 1, wherein said combining is a concatenation.

5. A method for decryption of ciphertext data on a host, the ciphertext data having an arbitrary data size, the decryption based on a secret key stored in a hardware token separate from the host and connected to the host without revealing the secret key to the host, the method comprising:

in the host, dividing the ciphertext data into a first ciphertext section and a second ciphertext section, wherein said first ciphertext section has a predetermined size, and wherein said second ciphertext section has a size larger than said predetermined size of the first ciphertext section;

sending, from the host to the token, said first ciphertext section;

in the hardware token, decrypting said first ciphertext section according to the secret key to obtain a derivative key;

in the hardware token, decrypting said derivative key according to the secret key, to obtain a value;

sending said derivative key and said value to the host;

in the host, decrypting said second ciphertext section according to said derivative key, to obtain a second plaintext section, wherein said second plaintext section has a size identical to that of said second ciphertext section;

in the host, computing a first plaintext section based on said value;

in the host, combining said first plaintext section and said second plaintext section to obtain plaintext data having a size identical to the arbitrary data size of said ciphertext data, and wherein said plaintext data is the decryption of the ciphertext data.

6. The method of claim 5, wherein the size of said second ciphertext section is not an integer multiple of said predetermined size.

7. The method of claim 5, wherein said decrypting said second ciphertext section is done by a stream cipher.

8. The method of claim 5 wherein said combining is a concatenation.

* * * * *